US007049943B2

(12) United States Patent
Pratt

(10) Patent No.: US 7,049,943 B2
(45) **Date of Patent: *May 23, 2006**

(54) VEHICLE TRUNK SAFETY DEVICE

(76) Inventor: Wyatt Barton Pratt, 229 Marsh Oaks Dr., Wilmington, NC (US) 28411

( * ) Notice: Subject to any disclaimer, the term of this patent is extended or adjusted under 35 U.S.C. 154(b) by 0 days.

This patent is subject to a terminal disclaimer.

(21) Appl. No.: 10/982,680

(22) Filed: Nov. 8, 2004

(65) Prior Publication Data

US 2005/0068160 A1 Mar. 31, 2005

Related U.S. Application Data

(62) Division of application No. 10/394,969, filed on Mar. 24, 2003, now Pat. No. 6,825,755.

(51) Int. Cl.
*B60R 25/10* (2006.01)

(52) U.S. Cl. ............................ 340/426.29; 340/425.5; 340/426.1; 340/430; 340/429; 296/76; 296/336.3

(58) Field of Classification Search ........... 340/426.29, 340/425.5, 426.1, 430, 429; 296/76, 336.3
See application file for complete search history.

(56) References Cited

U.S. PATENT DOCUMENTS

| | | | | |
|---|---|---|---|---|
| 534,254 | A | 2/1895 | Egerland et al. | |
| 2,801,404 | A | 7/1957 | Lopez | 340/48 |
| 3,740,567 | A | 6/1973 | Atkins | 307/10 SB |
| 3,920,940 | A | 11/1975 | Brown et al. | 200/52 R |
| 4,725,817 | A | 2/1988 | Wihlborg | 340/365 R |
| 4,739,585 | A | 4/1988 | Pickles | 49/280 |
| 5,445,326 | A | 8/1995 | Ferro et al. | 292/336 |
| 5,711,559 | A | 1/1998 | Davis | 292/340 |
| 5,859,479 | A | 1/1999 | David | 307/10.8 |
| 5,894,906 | A | 4/1999 | Weber | 180/274 |
| 6,018,292 | A | 1/2000 | Penny, Jr. | 340/426 |
| 6,086,131 | A | 7/2000 | Bingle et al. | 296/76 |
| 6,130,614 | A | 10/2000 | Miller et al. | 340/573.4 |
| 6,825,755 | B1 * | 11/2004 | Pratt | 340/426.29 |

OTHER PUBLICATIONS

Article: "GM Adding Auto-Trunk Opener", downloaded internet Sep. 7, 2000; http://www.abcnews.go.com/sections/living/DailyNews/gm_trunk990608.html.
Article: "Kids' behavior in car trunks unpredictable, GM study finds", downloaded internet Sep. 7, 2000; http://detnews.com/1999/autos/9907/11/07100042.htm.
Report to Congress, NHTSA, Motor Vehicle Trunk Entrapment, Feb. 2000, USDT.

* cited by examiner

*Primary Examiner*—Daryl C Pope

(57) ABSTRACT

A vehicle trunk safety device indicates the presence of an individual within the trunk.

20 Claims, 1 Drawing Sheet

VEHICLE TRUNK SAFETY DEVICE

This is a division of application Ser. No. 10/394,969 filed Mar. 24, 2003, now U.S. Pat. No. 6,825,755.

BACKGROUND OF THE INVENTION

1. Field of the Invention

The present invention relates to a device and method of indicating the presence of an individual within the trunk of a vehicle. More particularly, general or specific movement of an individual within the vehicle trunk that causes repeated contact with a mat while the vehicle is stationary activates a safety device of the vehicle trunk.

2. Description of the Related Art

Children and other individuals may become locked within the trunk of a vehicle. This may occur as a result of children playing within a vehicle trunk or from criminal activity, such as car-jacking or kidnaping, when a person is forced into the trunk against his or her will. This becomes an extremely dangerous situation, which may result in serious injury or death of the person trap within the trunk. Ensuring an adequate escape of the trapped individual from a locked vehicle trunk is extremely important.

Several vehicle trunk release mechanisms have been disclosed in the art. U.S. Pat. No. 5,711,559 to Davis and U.S. Pat. No. 6,086,131 to Bingle et al. disclose grippable handles within the trunk of a vehicle. U.S. Pat. No. 5,445,326 to Ferro et al. discloses a cable formed into a loop which may be pulled by the person in the trunk compartment. U.S. Pat. No. 5,859,479 to David, U.S. Pat. No. 6,018,292 to Penny, Jr. and U.S. Pat. No. 6,130,614 to Miller et al. disclose a push mechanism as part of a trunk release mechanism, such as a push button or pad, for releasing the vehicle trunk lid from inside of the trunk. Each of these devices requires a person confined within a vehicle trunk to have a working knowledge of the release device to properly activate the mechanism. Problematic with these devices is that a trapped child or confused adult within the vehicle trunk must typically locate, comprehend and physically enable the release mechanism to use it. Physical enablement of the release mechanism requires the trapped person to purposely engage the mechanism with that person's body, such as the person's hands. This may preclude the individual trapped within the vehicle trunk from being able to use the release mechanism.

It has been disclosed within U.S. Pat. No. 6,130,614 to Miller et al. that: "Prior vehicle trunk detection and release systems addressed these needs by placing pressure sensors and/or heat sensors within the trunk in an attempt to sense or detect the presence of a trapped individual within the trunk. Particularly, the pressure sensors were typically placed on and/or within the "floor" of the trunk and detected the body weight of the trapped individual. Once the body weight of the individual was detected, the pressure sensors generated a warning signal to the user/operator of the vehicle notifying the user/operator of the detected presence of the trapped individual. The heat sensors were deployed throughout the trunk and detected the body heat of the trapped individual. The heat sensors similarly generated a warning signal upon detecting such body heat. While these sensors did indeed detect the presence of a trapped individual, they oftentimes provided a false warning or output signal due to the presence of relatively heavy objects (e.g. many grocery packages) within the trunk and/or due to the presence of hot food or other heated objects within the trunk and/or heat which was generated within the trunk during a hot summer day."

There is a need in the art to provide a reliable vehicle trunk safety device to facilitate the release of a trapped person within a vehicle trunk. The present invention addresses this need.

SUMMARY OF THE INVENTION

The present invention includes a vehicle trunk release device comprising a contact surface for placement within the interior of a vehicle trunk and an actuator, having a timing unit, communicatively linked to the contact surface and capable of receiving an input from the contact surface, wherein the actuator initiates a safety device in response to repeated timed contact with the contact surface.

The present invention also includes a method for releasing the trunk lid of a vehicle comprising the steps of providing a safety mechanism for a trunk of a vehicle comprising a contact surface, an actuator, having a timing unit, capable of receiving an input from the contact surface, wherein the actuator initiates a safety device in response to repeated contact with the contact mat over a given time period, and a vehicle motion sensor communicatively attached to the actuator, locking the trunk lid and creating movement within the trunk while the vehicle remains stationary, wherein the contact surface detects the created movement within the trunk which is registered by the actuator and compared to the give time period of the timing unit, wherein the actuator initiates the safety device.

Additionally, the present invention includes an energized vehicle safety device product produced by the process comprising the steps of providing a safety mechanism for a trunk of a vehicle from within the interior of the trunk comprising a contact surface fixed within the interior of the vehicle trunk, an actuator, having a timing unit, capable of receiving an input from the contact surface, which is communicatively connected to the contact mat and a vehicle motion sensor communicatively linked to the actuator, locking the trunk lid with one or more persons inside of the vehicle trunk and creating movement within the vehicle trunk, wherein the contact surface detects the created movement within the trunk and the actuator initiates the safety device while the vehicle is stationary, wherein the presence of one or more persons in the vehicle trunk is recognized.

DETAILED DESCRIPTION OF THE PREFERRED EMBODIMENT

The present invention detects the presence of a person, either a child or an adult, within the trunk of a vehicle. A contact surface, preferably a contact mat, located along the bottom, inside top and/or sides within the trunk receives an input from the movement of the person confined within the truck. Repeated contact on the contact mat registers individual inputs which together indicate movement of the confined person when correlated to the movement status of the vehicle, and determines the presence of a trapped person. Once the determination is made of a trapped person in the vehicle truck, a signal is generated and communicated to an actuator which is communicatively coupled to the contact mat. The actuator receives the signal from the contact mat and energizes the safety device upon receipt of the signal. Contact with the contact mat may be correlated with vehicle movement at any suitable device, such as through the contact mat, actuator or other location. As such, the present invention detects the presence of an individual who is locked within a trunk, indicates the presence of the individual with an input caused from generalized movement of the trapped person that causes repeated contact with the contact mat. Additionally, the detected presence of the individual may automatically open the trunk. Intermittent pressure on the contact mat resulting from normal movement, e.g., non-specific movement, of the individual confined within the trunk actuates a safety device and/or open or release the trunk. The present invention provides a device that readily activates for a confined person who does not have knowledge of the existence of a safety release mechanism prior to that person activating the safety release mechanism. The terms "opening" and "release" for the purposes of the present invention include the unlocking, opening, unsecuring, lid displacement and/or other non-confining modes of the vehicle trunk door or lid. The terms "generalized movement" and "non-specific movement" encompass movement of a trapped individual that is performed regardless of the trapped person's knowledge of the existence of the release mechanism of the present invention. A trapped person also may purposely move, specific movement, to activate the release of the vehicle trunk lid, such as knowingly moving to activate the safety release mechanism of the present invention. More particularly, the repeated movement results from inadvertent movement, which includes movement such as frantic actions of the trapped occupant of the vehicle trunk and does not require specific directed action of the trapped occupant to engage the vehicle trunk release device. The release action of vehicle release device releases one or more trapped persons from the vehicle trunk, such as children.

Figure 1:
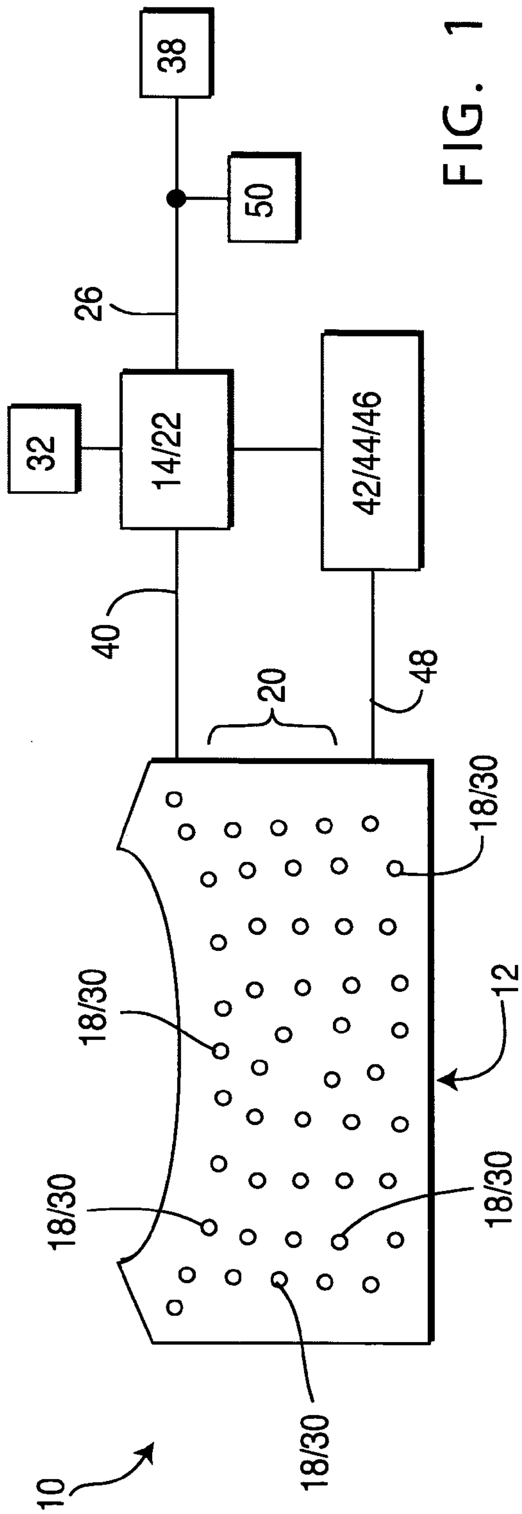
FIG. 1 illustrates component parts of the device for releasing a trunk lid from the interior of the trunk of the present invention; and, FIG. 2 illustrates the placement of the components of the present invention shown in FIG. 1 within the trunk of a automobile.
Figure 2:
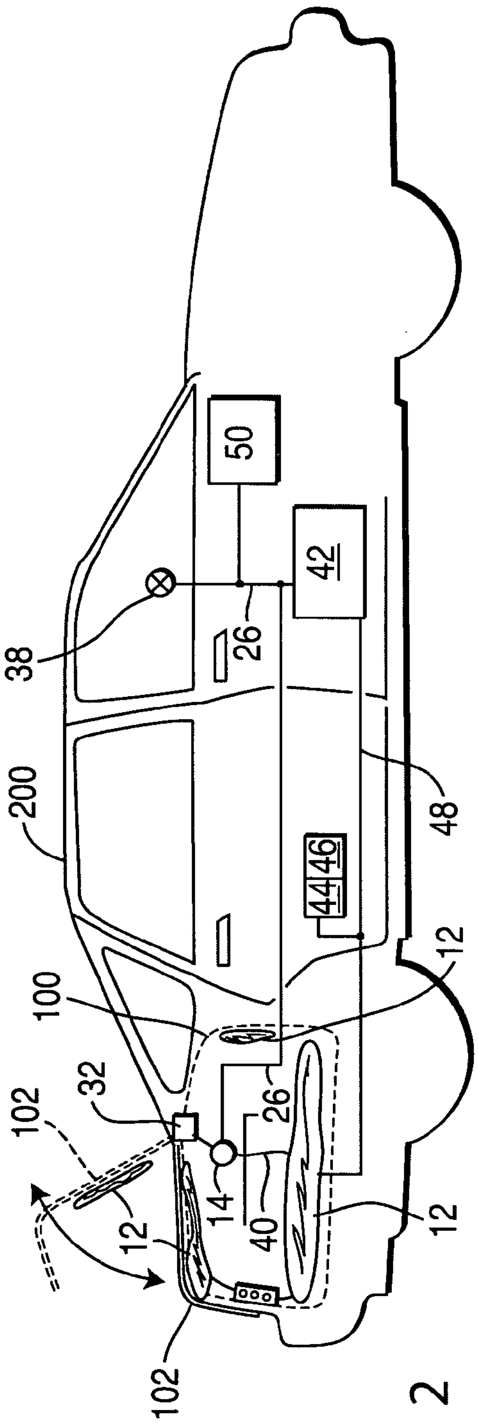

As seen in FIGS. 1 and 2, the present invention includes a safety release mechanism, also called a vehicle trunk release device herein, 10 comprising a contact surface, such as a contact mat, 12 and an actuator 14, highlighted in FIG. 1, for releasing a trunk lid 102 of a vehicle 200, shown in FIG. 2, from inside of the vehicle trunk 100. The contact surface 12 registers individual contact thereon, with the repeated contacts inputted to the actuator 14 for vehicle trunk 100 opening.

The contact surface 12 includes any suitable configuration for coverage within the interior of the vehicle trunk 100, such as a continuous contact layer, net, or other configuration that allows coverage of a substantial area within the vehicle trunk 100. The contact surface 12 may include structural parts of the vehicle trunk 100, such as metal or plastic flooring or walling of the vehicle trunk 100 with sensors therein, preferably having a spray, mat or coat covering thereon. Most preferably the contact surface 12 includes a contact mat 12. When used, the contact mat 12 may be fixed to the inside of the interior of the trunk 100 with an adhesive. Substantial areas are those areas that would reasonably receive repeated contact from an individual trapped within the vehicle trunk 100. This area may vary with different trunk dimensions. Preferably, substantial area of the contact mat 12 includes up to about one hundred percent (100%) of the surface area within the vehicle trunk 100, and may include any appropriate area coverage, such as up to 75%, 50%, 25,% or less, and percentages therebetween, as needed for the dimensions of a given vehicle trunk 100 and configuration of the contact mat 12 as determinable by those skilled in the art in light of the disclosure herein to allow a given assurance of vehicle trunk lid 102 release for a trapped individual. When installed within a vehicle trunk 100, the contact mat 12 may be trunk floor mounted device, trunk lid mounted device, inside trunk side mounted or any combination thereof, with floor mounting preferred.

The contact mat 12 may comprise one or more contact input receivers 18, with an array 20 of multiple contact input receivers 18 preferred, having individual contact input receivers 18 arranged or set apart, preferably in an organized configuration, to provide suitable coverage within the vehicle trunk 100. The contact mat 12 of the present invention preferably comprises a plurality of at least twenty (20) contact input receivers 18 arranged along the bottom of the vehicle trunk 100, spaced apart in a grid at a distance of from about one-half inch (½") to about three inches (3"), more preferably spaced from about one inch (1") to about two inches (2"), and most preferably spaced approximately one and one-half inches (1½") apart. Preferably the one or more contact input receivers 18 input into timing device, such as a singular timing unit, 22. This allows repeated contacts at a singular contact input receiver 18, or a single contact at more than one contact input receiver 18, to be considered measuring repeated contacts on the contact mat 12. Sizes of the contact input receiver 18 are any appropriate size for registering a contact, preferably being from about one-eighth (⅛) inch to about two (2) inches in diameter, more preferably from about one-quarter (¼) inch to about one (1) inch, and most preferably from about three-eighth (⅜) inch to about one half (½) inch.

Preferably the contact input receivers 18 of the contact mat 12 includes a contact detector 30, e.g., such as that used with squeeze actuated musical or recorded play-back toys, embodied in such toys as the Silly Slammers™ manufactured by Gibson Toys of Cincinnati, Ohio, the keys of an electric piano, touch pads including electronic weight scales, the keys on a commercially available computer, or other appropriate contact registering device. Representative pressure responsive devices are disclosed in U.S. Pat. No. 3,740,567 to Atkins, U.S. Pat. No. 3,920,940 to Brown et al., and U.S. Pat. No. 4,725,817 to Wihlborg, the disclosure of these patents are incorporated herein by reference. Typical contact detectors 30 may include an open circuit that becomes closed with sufficient pressure thereto, electrically registering the presence of the pressure from body weight, hand pushing, kneeling, rolling, etc. Appropriate construction and configuration of the contact detectors 30 are determinable by those skilled in the art. The contact detectors 30 are preferably responsive to any suitable force applied to the contact mat 12, such as a repeated force of from about 0.5, 1, 2, 3, 4, 5, 6, 10, 20, etc. pounds of force, including lesser, greater and intermediate amounts of force, as determinable by those skilled in the art to detect a trapped person for a given configuration of the contact mat 12 within the vehicle trunk 100. Contact with the contact mat 12, through the contact input receivers 18, may occur with a person's hands or fists, knees, head, shoulders, feet, buttock, back and/or any other body part that presses the contact mat 12 with a given amount of force, thereby activating the vehicle trunk release device 10 and opening the vehicle trunk 100.

The timing unit 22, which preferably constitutes part of the actuator 14, measures the interval or delay between contacts on the contact mat 12, appropriate to indicate the present of a moving person within the vehicle trunk 100.

Preferably, the timing unit 22 measures repeated contacts of from about two-tenths (0.2) seconds to about two (2) minutes, more preferably from about one half (0.5) second to about thirty (30) seconds, and most preferably from about one (1) second to about five (5) seconds, with representative times including for example, without limitation, 1, 2, 3, 4, 5, 6, 7, 8, 9, 10, etc. seconds, and lesser, greater or intermediate periods of time, as determinable by one skilled in the art. The timing unit 22 may measure contacts in a manner that disregards contacts that occur too early, with additional contacts within the appropriate time period being sufficient to cause activation of the safety release mechanism 10. In one preferred embodiment, the timing unit 22 measures greater than two repeated contacts over a given time period, or two contact events over an extended period of time, such as for example without limitation 10, 20 or 30 seconds, to ensure an object that has fallen within the vehicle trunk 100 does not activate the vehicle trunk release device 10. Appropriate timing and placement of the repeated contacts for activation of the safety release mechanism 10 is determinable by one skilled in the art though ordinary experimentation. The timing unit 22 may include a calculation device, or similar equipment, that operates under stored program control and which is communicatively, and preferably physically, coupled to the actuator 14, communicatively linked to the contact mat 12, and trunk release via a cable or similar bus or other activation system sufficient to relay contact information to the actuator 14 for enablement of the vehicle lid 102 release. The calculation device comprises a microprocessor, micro-controller, or other like event calculator. The timing unit 22 may be used for registering contacts outside of a given time period, either as too early or too late, which also maybe used in a cumulative manner for regulating the opening of the vehicle trunk 100.

The contact mat 12 is fixedly secured, attached, and/or mounted within the interior of the vehicle trunk 100, either as an insert or structurally integrated into the lining of the interior of the vehicle trunk 100. The contact mat 12 is physically and communicatively coupled to the actuator 14 by the use of bus 40. The contact mat 12, actuator 14 and/or timing unit 22 may be powered from the vehicle battery 42, and preferably comprises a separate battery device 44 that receives electric power generally "sourced" or obtained from the vehicle battery 42 attached to the contact mat 12, actuator 14 and/or timing unit 22 effectively to allow and/or to cause the contact mat 12, actuator 14 and/or timing unit 22 to remain active from the vehicle battery 42 and/or have the separate battery device 44 continuously recharged. Other powering systems 46, alone or in combination with the vehicle battery 42 and/or separate battery device 44 may be used, such as external charging units, and other such charging devices known to those skilled in the art. Preferably safety release mechanism 10 is powered from the vehicle battery 42, in combination with its own separate power source 46, which may be a charging device for recharge during movement of the vehicle 200. The separate power source 46 may be provided by a battery, such as a rechargeable battery, preferably is used as a backup electrical power source to the motor vehicle battery 42. The combination vehicle battery 42 and/or separate battery device 44, with or without the separate power source 46, allows operation of the vehicle release mechanism 10 even when the car's electrical system is not powered fro the car's motor. The separate battery device 44 and/or other powering system 46, may be located adjacent to the contact mat 12 or in the motor vehicle 200 separate from the contact mat 12.

The contact mat 12, with the second contact thereon over a given time period, generates and communicates a signal to the actuator 14, by use of contact bus 40, which causes the actuator 14 to initiate opening of the vehicle trunk 100. The actuator 14 functions to release the trunk lid 102 in response to repeated contact with the contact mat 12. The actuator 14 operates when the vehicle 200 remains stationary. The vehicle 200 may be evaluated as stationary through any appropriate device 38 such as a vehicle motion sensor 38, or other like method for determining movement of the vehicle 38, such as a gear register, wheel movement, battery drain, vehicle ignition switch and/or any other appropriate indication, or group of indications, for determining the movement status of the vehicle 200. Stationary vehicle status 38 may be communicated to the actuator 14 and/or timer 22 through any appropriate signaling means, such as status bus 26. As such the communicated status may include an on-going input for determining the motion status of the vehicle or as an off/on mechanism for the timing unit 22 to register contact inputs, etc. Repeated contact with the contact mat 12 releases the trunk lid 102 while the vehicle 200 remains stationary.

Release of the vehicle trunk lid 102 occurs from an appropriate release device of the trunk lid 102, such as a trunk latch opener 32. The trunk latch opener 32 physically disengages, or unlocks, the trunk lid 102, when activated. For example, when the contact mat 12 of the present invention receives a contact, a signal relays to the actuator 14. Once the actuator 14 receives an additional input from the contact mat 12 registering a second or more, i.e., repeated, contacts, the actuator 14 may complete an electrical circuit, such as a solenoid component of the trunk latch opener 32 that unlocks the trunk lid 102. The circuit may be appropriately powered, such as by the motor vehicle battery 42, the secondary battery 44, separate power source, etc., as maybe determined by one skilled in the art in light of the disclosure herein.

The present invention may be used in combination with other safety devices 50, such as an indicator showing the status of the vehicle trunk being open or closed, a malfunction indicator of the safety release mechanism 10, a manual deactivation switch, that deactivates the safety release mechanism 10, and/or combinations thereof. Warning lights, signals, horns, headlights, or other such vehicle components may be energized separately or in combination with the opening of the vehicle trunk 100, as determinable by those skilled in the art. Other light emitting sources, noise generating devices, either independent of, or in combination with, existing vehicle lights and/or horn, cameras, motion detectors, voice detectors, carbon dioxide detectors, and other such devices also may be used in combination with the present invention. Preferably, the safety release mechanism 10 is used separately from other safety devices with the exception of a dual use mode of the present invention to indicate movement within the vehicle trunk 100 while the vehicle 200 is in motion, without activating the opening of the vehicle trunk lid 102. Such movement indication includes without limitation, light, sounds and/or other indicators, to draw attention to such determined vehicle trunk 100 status while the vehicle 100 is in motion.

The safety release mechanism 10 may be installed as a retrofit kit on existing motor vehicles or as original equipment on new motor vehicles 200.

Operation of the present invention in a motor vehicle includes a contact event on the contact mat 12 within the vehicle trunk 100 which creates an actuator registration event. With additional, or repeated, contacts with the contact mat, the contact pattern, or patterns, are compared with given parameters of the actuator, generally through the timing unit 22 which relays the information to the actuator 14. Vehicle movement information or status is relayed to the actuator 14 for same time comparison. When a determination is made in the actuator 14 that the contact pattern is within the parameters for releasing the vehicle trunk lid 102, and the vehicle motion status 38 is determined to be stationary, the actuator 14 initiates a signal to the trunk latch opener 32 to open the trunk lid 102. With the opening of the trunk lid 102, the trapped person is released from the confines of the vehicle trunk 100. When the vehicle 200 remains stationary while the contact mat 12 registers repeated contacts over a given time period, a living person is presumed to be trapped within the closed vehicle trunk 100. Repeated contacts registered during vehicle 200 movement does not activate the safety release mechanism 10 to open the locked vehicle trunk 100, however notice of such movement within the trunk may be relayed to the driver of the vehicle such as through an indicator or other means.

The present invention automatically energizes the safety device 50 for the vehicle trunk 100 without intervention by the driver/operator of the vehicle 200, shown below in the Activation of Safety Device Matrix table.

Activation of Safety Device Matrix

| | Movement Detected Inside of Trunk (e.g., two or more contacts detected over a given period of time) | Movement Not Detected Inside of Trunk |
|---|---|---|
| Vehicle Determined to be in Motion | Safety Device Not Activated (with optional indicator activated) | Safety Device Not Activated |
| Vehicle Determined Not To Be In Motion | Safety Device Activated | Safety Device Not Activated |

The present invention removes the necessity of enticing a trapped child or confused adult to touch a particular pad release. Activation of the present invention does not require anything to be seen within the dark confines of the closed trunk. By using the movement of a confined person with a vehicle trunk, activation of the trunk release occurs.

The foregoing summary, description, examples and drawings of the invention are not intended to be limiting, but are only exemplary of the inventive features which are defined in the claims.

What is claimed is:

1. A vehicle trunk safety device, comprising:

a contact surface for placement within the interior of a vehicle trunk; and, an actuator, having a timing unit, communicatively linked to the contact surface and capable of receiving an input from the contact surface, wherein the actuator initiates a safety device in response to repeated timed contact with the contact surface.

2. The device of claim 1, further comprising a vehicle motion sensor communicatively attached to the actuator.

3. The device of claim 1, wherein the contact surface comprises a contact mat.

4. The device of claim 1, wherein the contact surface comprises one or more contact input receivers.

5. The device of claim 4, wherein the one or more contact input receivers input into a singular timing unit.

6. The device of claim 1, wherein the timing unit measures repeated contacts of from about 2 seconds to about 10 seconds.

7. The device of claim 1, wherein the timing unit measures repeated contacts over a time period interspersed with additional contacts.

8. The device of claim 1, wherein the actuator is responsive to a force of from about 2 pounds per square inch or more applied to the contact mat.

9. The device of claim 1, wherein the safety device is selected from the group consisting of warning lights, signals, horns, headlights, vehicle trunk release and combinations thereof.

10. A vehicle safety mechanism comprising a vehicle motion sensor together with the device of claim 1, wherein repeated contact with the contact surface initiates a safety device while the vehicle remains stationary.

11. The device of claim 1, wherein the contact mat comprises a trunk floor mounted device.

12. The device of claim 1, wherein the contact mat comprises a trunk lid mounted device.

13. The device of claim 1, further comprising a charging device for recharge during movement of the vehicle.

14. The device of claim 1, wherein the vehicle motion sensor comprises a gear register.

15. The device of claim 1, further comprising an indicator within the vehicle showing a trunk release status selected from the group consisting of trunk release, malfunction of the safety release mechanism, vehicle location device and combinations thereof.

16. A method for energizing a safety device for the trunk lid of a vehicle, comprising the steps of:

providing a safety mechanism for a trunk of a vehicle comprising a contact surface, an actuator, having a timing unit, capable of receiving an input from the contact surface, wherein the actuator initiates a safety device in response to repeated contact with the contact mat over a given time period, and a vehicle motion sensor communicatively attached to the actuator;

locking the trunk lid; and, creating movement within the trunk while the vehicle remains stationary, wherein the contact surface detects the created movement within the trunk which is registered by the actuator and compared to the give time period of the timing unit, wherein the actuator initiates the safety device.

17. The method of claim 16, wherein the created movement comprises inadvertent movement.

18. An energized vehicle safety device product produced by the process comprising the steps of:

providing a safety mechanism for a trunk of a vehicle from within the interior of the trunk comprising a contact surface fixed within the interior of the vehicle trunk, an actuator, having a timing unit, capable of receiving an input from the contact surface, which is communicatively connected to the contact mat and a vehicle motion sensor communicatively linked to the actuator;

locking the trunk lid with one or more persons inside of the vehicle trunk; and, creating movement within the vehicle trunk, wherein the contact surface detects the created movement within the trunk and the actuator initiates the safety device while the vehicle is stationary, wherein the presence of one or more persons in the vehicle trunk is recognized.

19. The product of claim 18, wherein the created movement comprises inadvertent movement.

20. The product of claim 18, wherein the released vehicle trunk lid product comprises one or more children released from the vehicle trunk.

* * * * *